Aug. 22, 1961  SHIH-YING LEE  2,997,067
FLOW CONTROL VALVE HAVING SUSPENDED MOVABLE VALVE ELEMENT
Original Filed Dec. 24, 1953
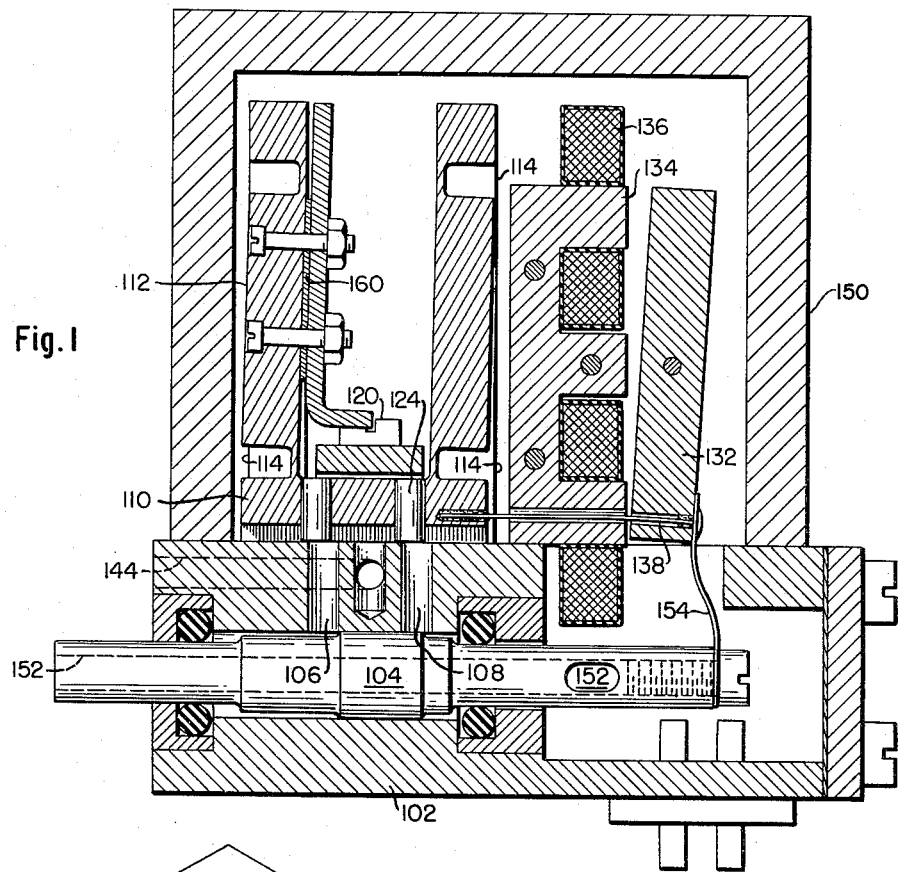
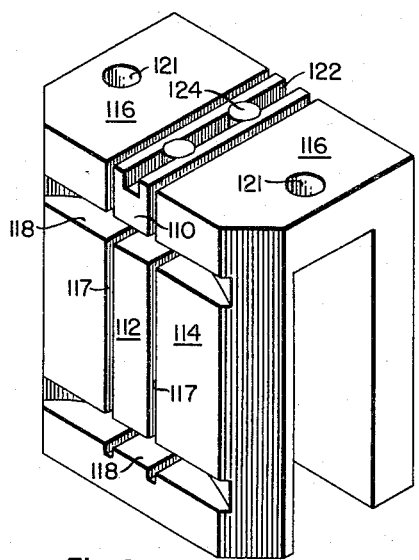
*INVENTOR.*
SHIH-YING LEE
BY Kenway, Jenney, Witter
 + Hildreth
ATTORNEYS United States Patent Office 2,997,067
Patented Aug. 22, 1961

2,997,067
FLOW CONTROL VALVE HAVING SUSPENDED MOVABLE VALVE ELEMENT
Shih-Ying Lee, South Lincoln, Mass., assignor to Research Corporation, New York, N.Y., a corporation of New York
Original application Dec. 24, 1953, Ser. No. 400,170, now Patent No. 2,875,782, dated Mar. 3, 1959. Divided and this application Jan. 30, 1959, Ser. No. 790,179
7 Claims. (Cl. 137—623)

The present invention relates to control valves, and is concerned more particularly with multiple-port valves for the control of gaseous and liquid fluids under high pressure and where extremely accurate control characteristics are required.

There are numerous applications where multi-port flow control valves are employed. By way of illustration, many types of servo mechanisms make use of a control valve by which the flow of hydraulic fluid to a reversible hydraulic motor must be controlled with precision from a relatively low power level device, such as an electromagnetic actuator or torque motor. Commonly such hydraulic control valves are of the so-called four way type, employing an axially slidable valve spool operating within the valve body to admit hydraulic fluid to one side or the other of the hydraulic motor, and to permit discharge of fluid through the valve from the respective exhaust side of the motor.

For applications requiring precise control of high pressure fluid, conventional spool type control valves are difficult to construct with the required accuracy, and even if initially satisfactory, the precision cannot be maintained for any appreciable period of operation. For accurate control, the lands must be machined with exact relation to their cooperating shoulders, and the edges must be sharp. The abrading action of high pressure fluid, even when carefully filtered, is found to round off relatively quickly the sharp edges initially provided, so that the valve operation at small openings becomes erratic and non-linear.

In my copending application Serial No. 400,170 filed December 24, 1953 (now Patent No. 2,875,782), of which the present application is a division, there are disclosed flow control valves well adapted for the precise control of high pressure fluids, both gaseous and liquid, wherein the cooperating flow-controlling elements may be fabricated with extremely high precision to provide a flow characteristic varying linearly with valve opening. More specifically, there are disclosed valve constructions, applicable to valves of various types including flat plate, axially slidable, and rotating valve embodiments, wherein the critical flow-determining elements may be formed of hardened material and with accurately defined sharp edges, so as to provide and maintain for substantial period of operation a linear flow characteristic as a function of valve opening, even for valve openings close to zero.

The present invention concerns one of the embodiments disclosed in my said copending application (now Patent No. 2,875,782) relating to a valve construction which may advantageously but not necessarily embody the flow-controlling ports or orifices covered by my patent, wherein the contact pressure between relatively movable abutting surfaces of the valve parts may be substantially minimized, so as to permit operation with high pressure gaseous fluids as well as liquid without appreciable dry friction, between the relatively movable parts.

In the drawings illustrating the invention,
FIG. 1 is a sectional view of a valve wherein the movable valve element is supported by resilient connections of novel construction and arrangement.

FIG. 2 is an isometric view illustrating in enlarged detail the sliding valve member of the embodiment of FIG. 1, showing the method of suspension and the underside of the valve with its flow-controlling ports and passages.

Referring to FIG. 1 in which is shown a complete valve unit with electromagnetic actuator and including a hydraulic ram controlled by the valve, the valve is illustrated as employing circular ports and cooperating cylindrical plugs or inserts which register exactly when the valve is in closed position. The valve body 102, which also contains the piston 104 of the hydraulic ram, is provided with drilled ports 106, 108 which communicate directly with the ram chambers on each side of the piston.

The movable valve plate is indicated at 110, and is preferably formed integrally with its supporting arms 112, which in turn are integrally formed with the supports 114 and base 116. Parallel cuts 117 through this structure on each side of the valve plate 110 extend nearly to the top of the arms 112 to permit swinging movement of the valve plate and its supporting arms relative to the base 116. FIG. 2 shows an inverted view of this construction of valve plate and support. By milling transverse slots 118 in the arms 112, regions of reduced thickness in the arms 112 are provided which facilitate and localize the flexing. There is thus provided a rectilinear suspension system in which the valve plate may move in translation in a left and right direction as viewed in FIG. 1. By relieving the under surface of the valve plate 110 very slightly, as by lapping, the plate may be supported with the desired very slight clearance relative to the valve body, when the valve assembly is secured to the valve body by bolts 120 through holes 121.

The underside of the valve plate 110 is provided with a longitudinal groove 122 and cylindrical plugs 124, the plugs being in exact registry with the ports 106, 108 when the valve member is in neutral position. Such exact registry is readily obtained by drilling the valve plate and body simultaneously, with the parts secured together. Since the groove 122 is narrower than the diameter of the plugs 124, the orifice formed upon port opening is, as in the case of the first described embodiment, a narrow slit bounded by parallel sides and by similarly curved arcs. As a result, the port opening is a linear function of valve plate motion, even under conditions of very small openings, and consequently the valve provides a substantially linear flow characteristic.

In the apparatus shown in FIG. 1, the valve member 110 is arranged to be actuated by electromagnetic means, commonly termed a torque motor, comprising an armature 132 and pole pieces 134 carrying windings 136 adapted to be selectively energized from an amplifier or other source of control signal. A reed or wire 138 links the armature to the valve plate 110 to impart the required translational movements.

Under no-signal conditions, the valve plate is in neutral position with the plugs in exact registry with the ports to the ram cylinder, the valve suspension having sufficient stiffness to position the valve in neutral or off condition in the absence of any input signal to the torque motor windings. Under the influence of an input signal, the valve plate is urged in one direction or the other, depending on the phase or sign of the signal, thereby uncovering the ports. FIG. 1 shows the valve plate displaced to the left, so as to admit fluid from the inlet passage 144 to the port 106 and thereby causing the ram to move to the right. Escape of fluid from the right hand ram chamber takes place through port 108 and thence to the interior of the casing 150, from which the fluid is discharged by way of a central passage 152 through the ram itself. By reason of the resilient feedback connection 154 between ram and armature, the ram is caused to take a position (displacement) as a function of input signal. A plate 160 secured in spaced relation to the inner face of one of the suspension arms 112 provides effective damping action of the valve suspension to minimize any tendency toward instability in valve response.

By reason of the substantially linear flow characteristics of the valve and the freedom from friction effects resulting from the valve suspension, the system is capable of utilizing very high fluid pressures to provide substantial output forces for small signal inputs to the torque motor. The assembly accordingly provides a highly compact electro-mechanical amplifier capable of functioning effectively in high gain servo systems having severe performance requirements.

While the invention has been described in conjunction with particular port and orifice constructions and configurations, it is to be understood that the invention is not so limited, as the suspension feature may be utilized in valves independently of the disclosed construction and arrangement of ports and orifices.

I claim as my invention:

1. A flow control valve comprising a valve body and a movable valve element, cooperating ports in body and movable valve element comprising circular bores in the valve body, circular inserts in the movable valve element, said inserts having an outside diameter corresponding to the diameter of the bores in the valve body, said inserts being coaxial with the bores in the valve body when the movable valve element is in zero-flow position, a channel in the movable valve element extending longitudinally of the direction of movement of said element and alongside the inserts, said channel being narrower than the diameter of said inserts, and means for supporting said movable element in longitudinally displaceable closely spaced relation to the valve body.

2. A flow control valve comprising a valve body and a movable valve element having cooperating plane surfaces, ports in said surfaces, the ports comprising cooperating bores and circular inserts, the inserts having a diameter corresponding to the diameter of the bores to cut off flow communication with said bores when the inserts are in coaxial relation to said bores, and means for supporting the valve element in closely spaced translatable relationship to the valve body, said means comprising a base portion secured to the valve body and suspension means connecting the movable valve element with the base portion, said suspension means permitting relative translation of valve element and valve body in the plane of the cooperating plane surfaces of valve body and movable valve element while maintaining said parts with predetermined clearance between the cooperating surfaces.

3. A flow control valve comprising a valve body and a movable valve element, the valve body and valve element having cooperating plane surfaces, ports in said surfaces, said ports comprising cooperating bores and circular inserts, the inserts having a diameter corresponding to the diameter of the bores to cut off flow communication with said bores when the inserts are in coaxial relation to said bores, and means integral with the movable valve element for supporting said movable valve element in closely spaced longitudinally displaceable relation to the valve body comprising a base portion secured to the valve body, a gap in said base portion between which the movable valve element is disposed in spaced relation, and integral means connecting the movable valve element with the base portion comprising parallel arms having zones of reduced cross-section in quadrilateral relation to provide regions of flexure for swinging support of the movable valve element relative to the valve body in a predetermined longitudinal path.

4. A flow control valve comprising a valve body and a movable valve element having cooperating plane surfaces, cooperating ports and passages in the body and movable valve element, and means for supporting the movable valve element in closely spaced translatable relationship to the valve body, said means comprising a base portion secured to the valve body and quadrilateral suspension means connecting the movable valve element with the base portion, said suspension means permitting relative translation of valve element and valve body in the plane of the cooperating plane surfaces of valve body and movable valve element while maintaining said parts with predetermined clearance between the cooperating surfaces.

5. A flow control valve comprising a valve body and a movable valve element having cooperating plane surfaces, cooperating ports and passages in the body and movable valve element, and means for supporting the movable valve element in closely spaced translatable relationship to the valve body, said means comprising a base portion secured to the valve body, and a pair of substantially parallel supports connecting the movable valve element with the base, said supports being deflectable in the direction of movement of the movable valve element to permit relative translation of the valve element and body in the plane of the cooperating plane surfaces of valve body and movable valve element while maintaining said parts with predetermined clearance between the cooperating surfaces.

6. A flow control valve according to claim 5 wherein the substantially parallel spaced supports have regions of reduced cross-sectional area to permit localized flexing of said supports at those regions.

7. A flow control valve according to claim 5 wherein the substantially parallel spaced supports are in compression under the influence of fluid pressure between the valve body and the movable valve element.

No references cited.